Figure 1:
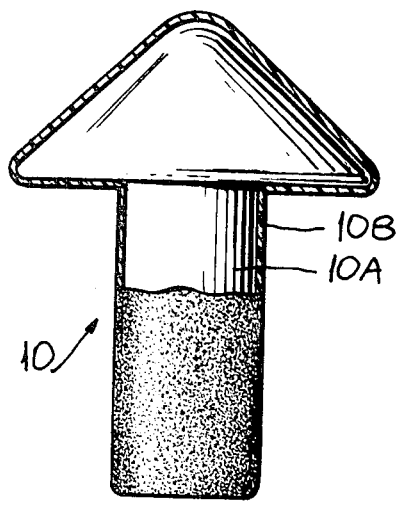

United States Patent

[11] 3,615,985

[72] Inventors Franklin G. Reick
228 W. Place, Westwood, N.J. 07675;
Robert S. Hanser, P.O. Box 338, Saddle River, N.J. 07458
[21] Appl. No. 796,712
[22] Filed Feb. 5, 1969
[45] Patented Oct. 26, 1971

[54] TUBELESS TIRE REPAIR PLUG INSERTION TECHNIQUE
5 Claims, 5 Drawing Figs.
[52] U.S. Cl. .................................................... 156/95, 152/370
[51] Int. Cl. .................................................... B60c 21/06
[50] Field of Search ........................................ 156/94, 95, 96, 97, 98; 152/370

[56] References Cited
UNITED STATES PATENTS

| | | | |
|---|---|---|---|
| 2,966,189 | 12/1960 | Chambers et al. | 152/370 |
| 2,990,736 | 7/1961 | Crandall | 152/370 |
| 3,013,454 | 12/1961 | Gruber | 152/370 |
| 3,296,048 | 1/1967 | Wolfe | 156/97 |

FOREIGN PATENTS

| 215,719 | 6/1958 | Australia | 156/97 |
|---|---|---|---|

Primary Examiner—Benjamin A. Borchelt
Assistant Examiner—Daniel Bent
Attorney—Michael Ebert ABSTRACT: A repair plug insertable by a pneumatic gun or other tool into a puncture formed in the casing of a tubeless tire, thereby to seal the puncture. The plug is constituted by a core of cured rubber coated with a tacky layer of vulcanizable rubber which, when subjected to the heat produced by a running tire, vulcanizes in place and bonds to the tire casing. Before being inserted in the puncture, the plug is coated with a temporary detackifying compound which lubricates the passage of the plug through the inserting tool. The compound is dissolvable in rubber when subjected to the heat of the running tire so that it disappears in the plug and the bonding action of the tacky coating thereon is permitted to proceed.

PATENTED OCT 26 1971 3,615,985

INVENTORS
FRANKLIN G. REICK
BY ROBERT S. HANSER

ATTORNEY

TUBELESS TIRE REPAIR PLUG INSERTION TECHNIQUE

This invention relates generally to plug techniques for repairing tubeless tires, and more particularly to a technique for facilitating the insertion of a rubber plug into a tire puncture without interfering with the ability of the plug to bond to the tire and thereby effectively seal the puncture.

It is now the widespread practice to effect repairs in a tubeless tire by inserting a rubber plug in the puncture or other injury. Plugs formed solely from cured rubber will not readily vulcanize; hence plugs of this construction will not bond effectively to the cured rubber of the tire casing, even with the application of heat or by the use of a vulcanizing cement.

To overcome this difficulty, it is the present practice to form the plug with an uncured rubber layer which is coated over a cured rubber core. After insertion of the plug in the puncture, the uncured rubber layer will vulcanize, in situ, when subjected to the heat developed by the running tire.

In order to insert a plug of this type in the tire, use is generally made of a pneumatic gun adapted to drive the plug under high pressure into the puncture. The plug is in rivet form, being provided with a mushroomlike head and a long stem. In loading a pneumatic gun designed for such plugs, the plug is forced, stem-first, into the barrel of the gun. When the gun is fired, the plug is ejected under air pressure into the puncture, with the head of the plug penetrating the interior of the casing.

To prevent the plug from jamming in the pneumatic gun, its surface must be adequately lubricated. A lubricant has been found to be essential, for the high-pneumatic forces created by the gun cause the rubber of the plug to flow and elongate. The current trade practice in this regard involves coating the rubber plug at the factory with a film of silicone oil or another long-lasting lubricant which is not soluble in rubber and will remain indefinitely on the surface of the plug. While such lubricants carry out their proper function in the gun, which is to facilitate ejection of the plug, they continue to lubricate the plug after insertion in the tire.

This continued lubrication has adverse effects which may be quite serious, in that it inhibits effective bonding of the plug to the casing of the tire, for the lubricating film acts permanently as a parting agent or barrier between the plug and casing.

This creates a situation which is potentially very hazardous, for all that holds the plug in place is the internal air pressure exerted on the head of the plug. This peril has been recognized by the Rubber Manufacturer's Association which has issued warnings against the use of rubber repair plugs. The Association has pointed out that such plugs are not reliable and has recommended that their use be limited to temporary repairs in emergencies, but not otherwise. When considering that literally millions of rubber repair plugs are sold every year throughout the world, it will be appreciated that the danger involved is of major concern.

In view of the foregoing, it is the main object of this invention to provide a repair plug and a lubricant therefor which obviates the drawbacks incident to conventional repair techniques, and which may be readily inserted in a tubeless tire and effectively bonded thereto.

Also an object of the invention is to provide a washer patch which may be used in conjunction with a rubber plug to effect repairs of punctures whose damaged area on the interior of the casing is greater than the head of the plug.

Briefly stated, in a technique in accordance with the invention, use is made of a repair plug whose cured rubber core is coated with a tacky layer of vulcanizable rubber, the plug, before being loaded in the insertion tool, being covered with a temporary detackifying compound acting as a lubricant. The detackifying compound is chosen from a class of materials which are highly soluble in rubber and which will be absorbed therein when the temperature thereof is elevated to approximately 100° F. Thus, after insertion of the plug, when the lubricant is subjected to the heat of the running tire, it disappears into the rubber and the vulcanizable layer on the plug proceeds to vulcanize in place and bond to the tire to create a reliable seal which remains effective during the life of the tire.

Figure 2:
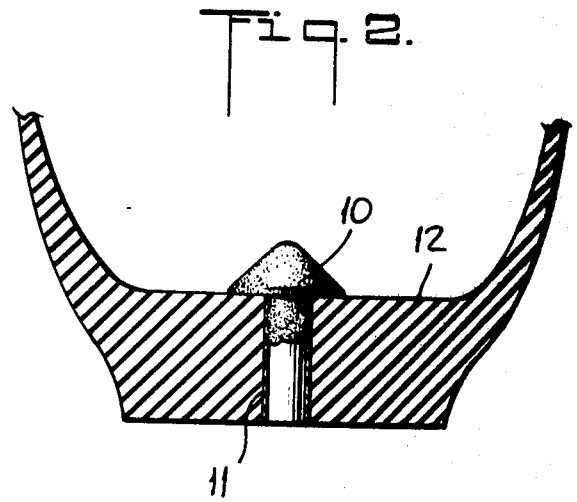
Figure 3:
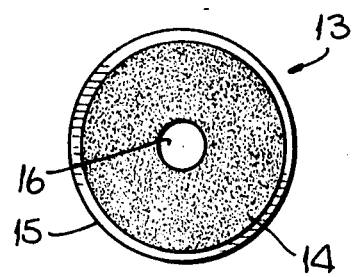
Figure 4:
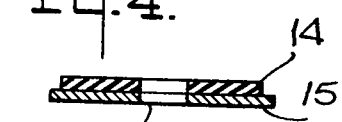
Figure 5:
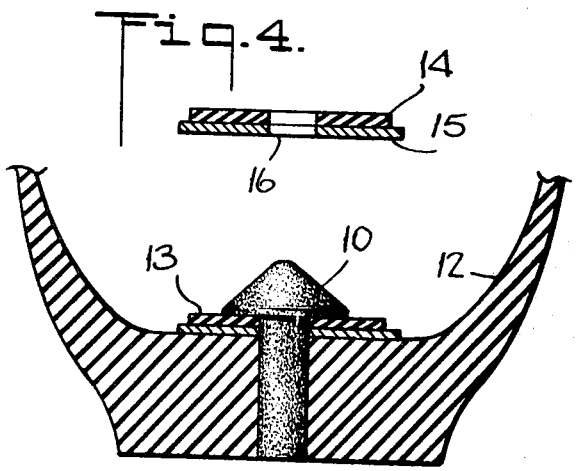

For a better understanding of the invention, as well as other objects and features thereof, reference is made to the following detailed description to be read in conjunction with the accompanying drawing, wherein:

FIG. 1 is an elevational view of a rubber repair plug for use in a technique in accordance with the invention, FIG. 2, in section, shows the plug after insertion in a puncture in the casing of a tubeless tire, FIG. 3 shows, in plan view, a washer in accordance with the invention to be used in conjunction with a repair plug, FIG. 4 is a sectional view of the washer, and FIG. 5 shows the washer and plug combination when installed in a tire.

THE REPAIR TECHNIQUE

Referring now to FIG. 1, there is shown a rubber plug 10 in accordance with the invention, the plug having a strong core 10A of cured rubber and a coating 10B thereover of tacky vulcanizable material. The plug is rivet-shaped so that it has a mushroom head and a relatively long stem whose length is greater than the thickness of any existing tire casing. Small and medium punctures generally require a ¾-inch plug while larger punctures call for a seven-sixteenth-inch plug. In practice, after insertion, the excess portion of the stem projecting from the casing is cut off.

The core 10A of the plug is manufactured by conventional molding techniques well known in the art. After manufacture, the plugs are washed and tumbled in a detergent solution to remove oil and other surface contaminants arising from the molding operation.

The cleaned plugs are carefully dried and then dipped in a solvent solution producing the desired vulcanizable coating 10B. A preferred form of high-tack solution for dip-coating mushroom plugs has the following composition:

2 pounds Crumb Rubber
one-half pound Zinc Oxide
one-half pound Tackifying Resin
one-half pound Soluble Sulfur Compounds
3 gallons Hexane
1 quart Toluene
10 grams Ultra Accelerator
one-half Chlorinated Polyphenols After the solvent has evaporated, the tacky plugs are then boxed for subsequent use. It is to be understood that the invention is not limited to the above coating and that existing vulcanizable coatings may be used on the plug. Alternatively, the plugs may be made entirely of natural rubber.

In field use, the plugs are inserted in tire punctures, using any existing form of air gun or tool such as those manufactured by Tyler Manufacturing Company. As pointed out previously, the tacky surface makes it impossible for the plugs to go through the inserting tool. Thereafter, before placing the plug into the tool, the plug is rubbed with a surface-active lubricant in accordance with the invention that temporarily renders the surface very slippery.

Before inserting the plug in the puncture or tire injury, the wall surrounding the puncture is made wet, using a conventional rubber cement for this purpose. The cement may be introduced by means of a probe dipped into the cement solution.

The detackifying lubricant is chosen from a class of materials that are highly soluble in rubber and will be absorbed thereby when the temperature is elevated to about 100° F. This temperature is quickly reached in a running tire. Thus as shown in FIG. 2, plug 10 is inserted in a puncture 11 in a casing 12, the head of the plug lying against the interior surface of the case. As the tire operates, the tacky layer 10B on the plug which has absorbed the lubricant again becomes very sticky, and eventually vulcanized under the influence of the heat, thereby bonding to and becoming part of the tire.

If the injured area inside the tire is greater than the head of the plug, a washer-shaped patch 13 is glued in place over this area. The washer is constituted by a rubber back 14 and a cushion base 15, the washer having a central hole 16 through which the head of plug 10 enters the casing. The diameter of the hole is about the same as the stem of the plug. Thus the plug head is prevented by the washer from being pushed out of the tire.

LUBRICANT

The requisite lubricant is one which has a desired degree of lubricity as well as solubility in the rubber to promote its eventual disappearance and the return of surface tackiness. Additional properties which are desirable are low toxicity, low cost and ease of handling. Compounds suitable for this purpose fall into three broad classes, namely A Liquid, B Paste, and C waxy Solid. The table below gives some examples of these compounds which have been tested with acceptable results.

(Class A - Liquid
Polyoxyethylene (20) Sorbitan Monopalmitate
Ethoxylated Oleamide
Bis (2-hydroxyethyl) Stearylamine Oxide (Class B – Paste)
Best { 1—(2-Hydroxyethyl)-2-Heptadecenyl-2-Imidazoline
N—Tallow—1,2 diaminopropane dioleate
N—Tallow—1,3, diaminopropane acetate (Class C - Waxy Solid)
Polyoxyethylene (9) Stearate
Polyoxyethylene (20) Sorbitan Tristearate
Polyethylene Glycol (4000) Mono Stearate
Oleamide (Armid 0-Armour Chem. Co.)
Octadecylamide (Armid 18-Armour Chem. Co.)
1-(2 Hydroxyethyl)-2-Hydrogenated tallow-
2-imidazoline
Hydrogenated Tallow Acid Amide It has been found that best results are obtained with compounds falling in the paste class at room temperature. These are derived from fatty diamines of the general formula:

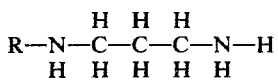

where R denotes an alkyl group derived from a suitable fatty acid.

These compounds contain both primary and secondary amine groupings. They are strong organic bases and exhibit great cationic activity. The ability to be absorbed onto rubber surfaces is enhanced by the polar-amino groups.

For safety in handling the amides are reacted with organic acids to form the surface active salts that are used as our disappearing lubricants. They have low toxicity and are easily handled. The compounds can be blended to give the desired paste at room temperature.

While there has been shown and described a preferred embodiment of a tubeless tire repair-plug-insertion technique, in accordance with the invention, it will be appreciated that many changes and modifications may be made therein without, however, departing from the essential spirit of the invention as defined in the annexed claims.

We claim:

1. In the technique for repairing a tubeless tire by means of a rubber plug which is insertable in a puncture by a pneumatic tool, said plug having a core of cured rubber and a tacky coating thereover of Vulcanizable rubber, whereby the plug, when the tire is heated, proceeds to vulcanize and bond to the tire to seal the puncture, the steps of:

A. coating the surface of the rubber plug with a temporary lubricant constituted by a detackifying agent which is dissolvable in the rubber when its temperature is at least about 100° F.,
   B. loading the tool with the lubricated plug and firing the plug into the puncture, the passage of the plug through the tool being facilitated by the lubricant,
   C. and running the plugged tire to create heat elevating the temperature of the lubricant to a point at which it is dissolved into the plug whereby the tacky coating on the plug is then in contact with the wall of the puncture and proceeds to vulcanize and bond thereto.

2. In a technique as set forth in claim 1, wherein said tacky coating is applied by dipping the core into a rubber solution including a tackifying resin and soluble sulfur compounds.

3. In a technique, as set forth in claim 1, wherein said lubricant is a compound which is liquid at room temperature and is of low toxicity and high lubricity.

4. In a technique, as set forth in claim 1, wherein said lubricant is a compound which is a paste at room temperature and is of low toxicity and high lubricity, said compound being derived from fatty diamines.

5. In a technique, as set forth in claim 1, wherein said lubricant is a waxy solid at room temperature and is of low toxicity and high lubricity.